(12) United States Patent
Asama et al.

(10) Patent No.: US 12,240,312 B2
(45) Date of Patent: Mar. 4, 2025

(54) TRAY AND TRAY MANUFACTURING METHOD

(71) Applicant: NIPPON STEEL CORPORATION, Tokyo (JP)

(72) Inventors: Hiromi Asama, Tokyo (JP); Junichiro Suzuki, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 311 days.

(21) Appl. No.: 17/783,508

(22) PCT Filed: Feb. 4, 2021

(86) PCT No.: PCT/JP2021/004074
§ 371 (c)(1),
(2) Date: Jun. 8, 2022

(87) PCT Pub. No.: WO2021/157648
PCT Pub. Date: Aug. 12, 2021

(65) Prior Publication Data
US 2022/0388386 A1 Dec. 8, 2022

(30) Foreign Application Priority Data
Feb. 4, 2020 (JP) .................................. 2020-017224

(51) Int. Cl.
*B60K 1/04* (2019.01)
*B62D 21/15* (2006.01)
(Continued)

(52) U.S. Cl.
CPC ................ *B60K 1/04* (2013.01); *B62D 21/15* (2013.01); *B62D 25/20* (2013.01); *H01M 50/20* (2021.01); *B60K 2001/0438* (2013.01)

(58) Field of Classification Search
CPC . B60K 1/04; B60K 2001/0438; H01M 50/20; B62D 21/15; B62D 25/20
See application file for complete search history.

(56) References Cited

U.S. PATENT DOCUMENTS 8,936,125 B2 * 1/2015 Nakamori ........... H01M 50/249
220/651
8,967,312 B2 * 3/2015 Yanagi ................ H01M 50/204
180/68.5
(Continued)

FOREIGN PATENT DOCUMENTS

CN 107732058 A 2/2018
CN 107732062 A 2/2018
(Continued)

*Primary Examiner* — John D Walters
(74) *Attorney, Agent, or Firm* — Myers Wolin, LLC (57) ABSTRACT

A tray (20) including a bottom wall (21) and a peripheral side wall (22) erected from an outer periphery of the bottom wall (21) includes a high-strength portion HT having a high tensile strength; and a low-strength portion LT having a tensile strength lower than that of the high-strength portion HT. The low-strength portion LT includes a recessed portion (C) having a corner portion (22C) in a first side wall inner surface (221*a*) and a second side wall inner surface (222*a*) which are adjacent to each other at a minor angle and a corner section (21C) on an upper surface (21*a*) of the bottom wall (21) having a minor angle to each of the first side wall inner surface (221*a*) and the second side wall inner surface (222*a*).

5 Claims, 4 Drawing Sheets

(51) Int. Cl.
*B62D 25/20* (2006.01)
*H01M 50/20* (2021.01)

(56) References Cited

U.S. PATENT DOCUMENTS

| | | |
|---|---|---|
| 9,056,631 B2 * | 6/2015 | Nakamori ........... H01M 50/227 |
| 2011/0143179 A1 | 6/2011 | Nakamori |
| 2013/0192914 A1 | 8/2013 | Nakamori |

FOREIGN PATENT DOCUMENTS

| | | |
|---|---|---|
| JP | 2011-124101 A | 6/2011 |
| JP | 2013-157242 A | 8/2013 |
| JP | 2014-19203 A | 2/2014 |

* cited by examiner

TRAY AND TRAY MANUFACTURING METHOD

TECHNICAL FIELD OF THE INVENTION

The present invention relates to a tray and a tray manufacturing method.

The present application claims priority based on Japanese Patent Application No. 2020-017224 filed in Japan on Feb. 4, 2020, the content of which is incorporated herein by reference.

RELATED ART

In the related art, there has been a battery case provided with a resin battery tray having a metal frame provided on an outer wall side and a battery cover covering the battery tray.

PRIOR ART DOCUMENT

Patent Document

[Patent Document 1] Japanese Unexamined Patent Application, First Publication No. 2011-124101

DISCLOSURE OF THE INVENTION

Problems to be Solved by the Invention

However, in the battery tray of the related art, in order to protect a placed battery, it is necessary to secure rigidity against crushing by an external force. Therefore, weight of the battery tray of the related art may be excessive.

In view of the above-mentioned problems of the background art, an object of the present invention is to provide a rigid and lightweight tray and a method of manufacturing the tray.

Means for Solving the Problem

A gist of the present invention is as follows.

(1) According to an aspect of the present invention, there is provided a tray including a bottom wall and a peripheral side wall erected from an outer periphery of the bottom wall, the tray including: a high-strength portion having a high tensile strength; and a low-strength portion having a tensile strength lower than that of the high-strength portion, in which the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

(2) In the above (1), the high-strength portion may be formed from the first side wall to a third side wall facing the first side wall via the bottom wall.

(3) In the above (1) or (2), an inner reinforcing material extending from the first side wall to a third side wall facing the first side wall may be provided on the bottom wall.

(4) In the above (3), the inner reinforcing material may overlap with the high-strength portion.

(5) In any of the above (2) to (4), the first side wall and the third side wall may include an outer reinforcing material extending along the first side wall and the third side wall.

(6) According to another aspect of the present invention, there is provided a method for manufacturing a tray including a bottom wall and a peripheral side wall erected from an outer periphery of the bottom wall, the method including: welding a high-strength portion having a high tensile strength and a low-strength portion having a tensile strength lower than that of the high-strength portion; and pressing the low-strength portion so that the low-strength portion includes a recessed portion having a corner portion in a first side wall inner surface of a first side wall and a second side wall inner surface of a second side wall which are adjacent to each other at a minor angle and a corner section on an upper surface of the bottom wall having a minor angle to each of the first side wall inner surface and the second side wall inner surface in the corner portion.

Effects of the Invention

According to the present invention, it is possible to provide a rigid and lightweight tray and a method of manufacturing the tray.

EMBODIMENTS OF THE INVENTION

A battery tray installed in a vehicle (vehicle body) is required to have high rigidity so as not to be excessively crushed in a vehicle width direction against an external force caused by side collisions of an obstacle or the like in order to protect a placed battery. In addition, the battery tray provided in the vehicle is preferably lightweight in order to improve fuel efficiency or electricity cost of the vehicle.

A tray of the present invention includes a bottom wall and a peripheral side wall erected from an outer periphery of the bottom wall. The tray includes a high-strength portion having a high tensile strength and a low-strength portion having a tensile strength lower than that of the high-strength portion. The low-strength portion includes a corner portion of the peripheral side wall having a first side wall surface of a first side wall and a second side wall surface of a second side wall forming a minor angle therebetween and a corner section of the bottom wall having a bottom wall surface having a minor angle to each of the first side wall surface and the second side wall surface in the corner portion. As a result, a region that mainly shares and receives an impact load acting on the tray from a vehicle width direction can be made into the high-strength portion, and a region that is difficult to press can be made into the low-strength portion. Therefore, the high-strength portion can prevent the tray from being plasticized at an early stage and greatly deformed, and can be made relatively lightweight. In addition, the low-strength portion makes it possible to easily manufacture the tray by pressing a steel sheet as a base metal. Therefore, a rigid and lightweight tray can be provided.

Hereinafter, embodiments of the present invention will be described.

Embodiment

Figure 1:
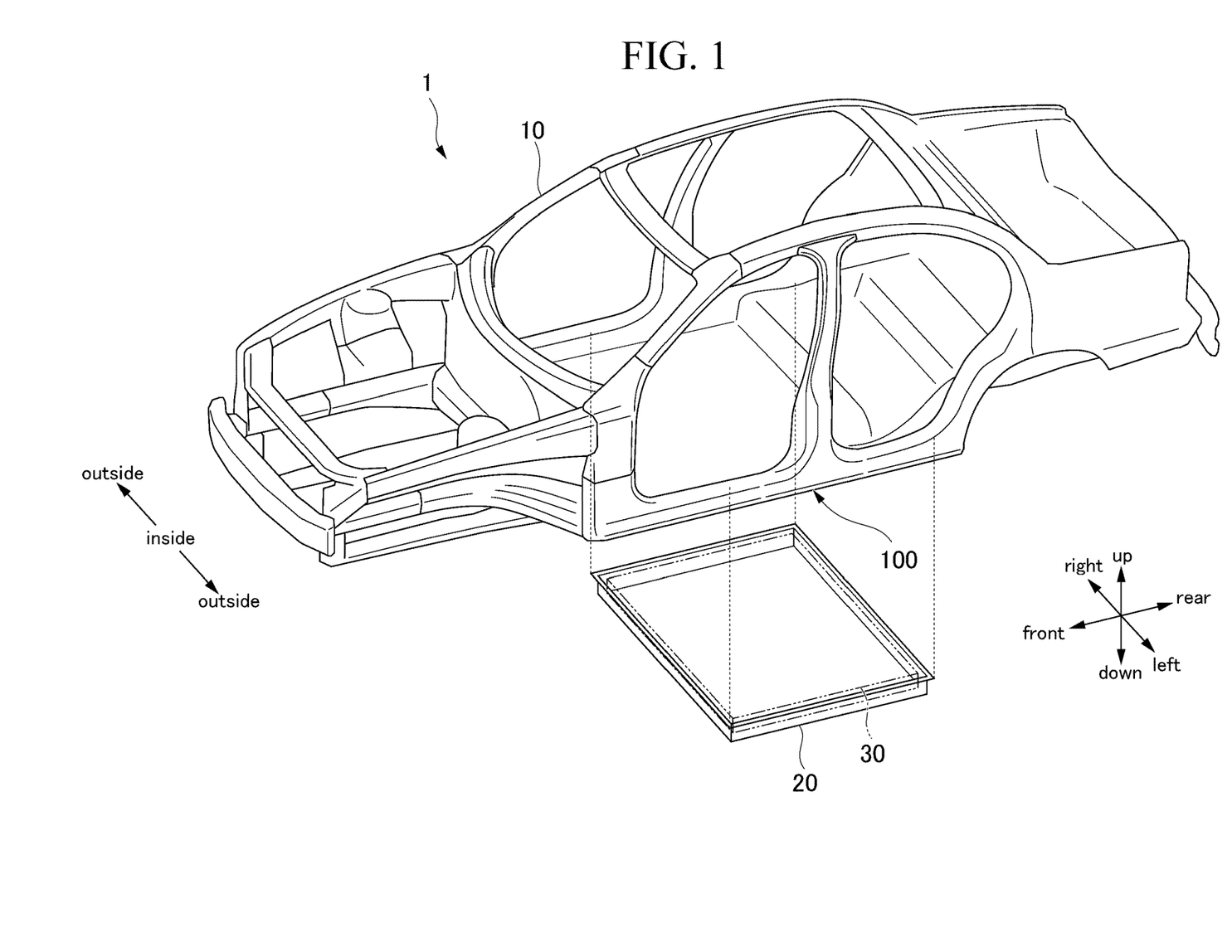
FIG. 1 is an explanatory diagram of a tray according to an embodiment.
Figure 2:
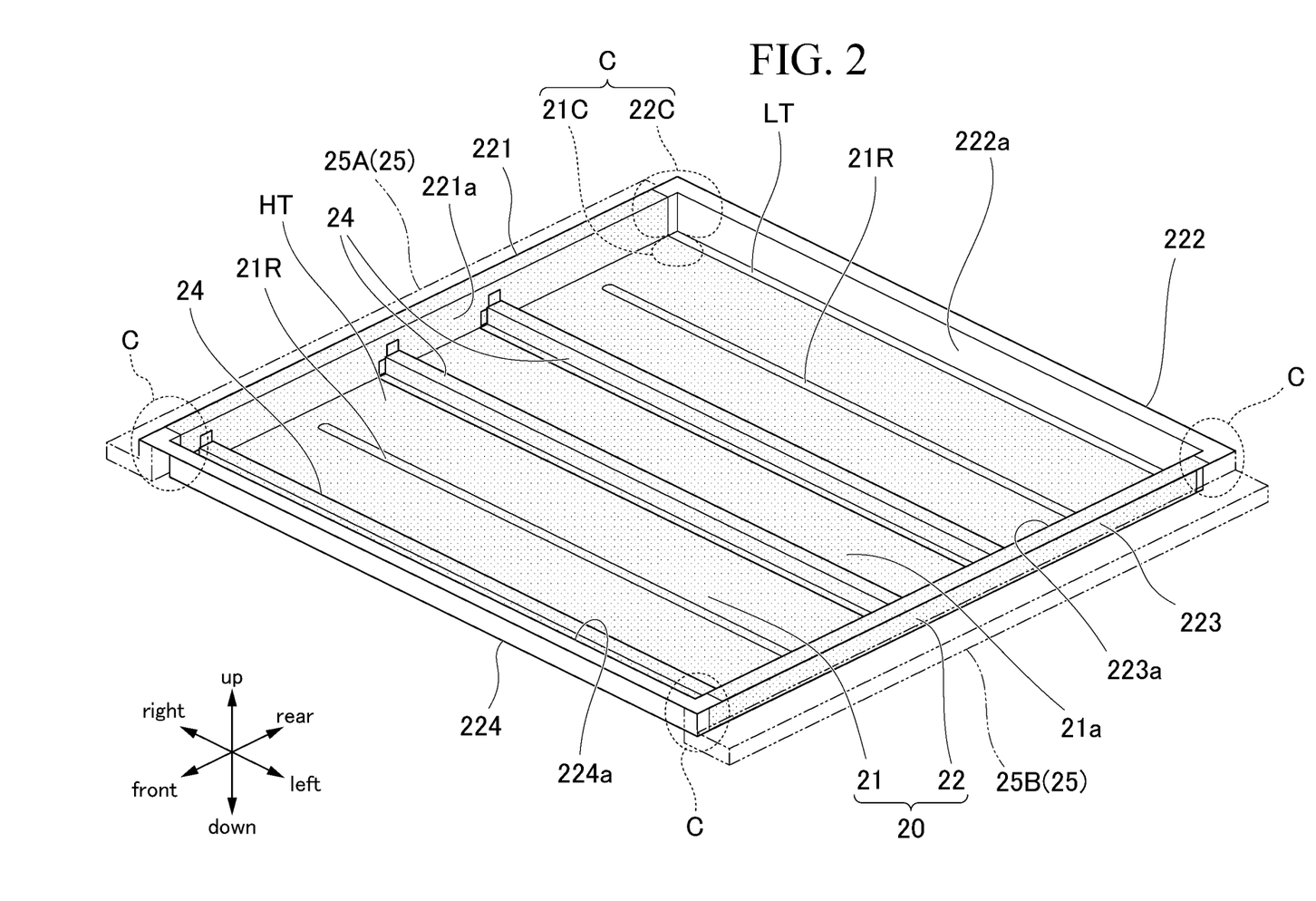
FIG. 2 is a perspective view of the tray according to the embodiment.
Figure 3:
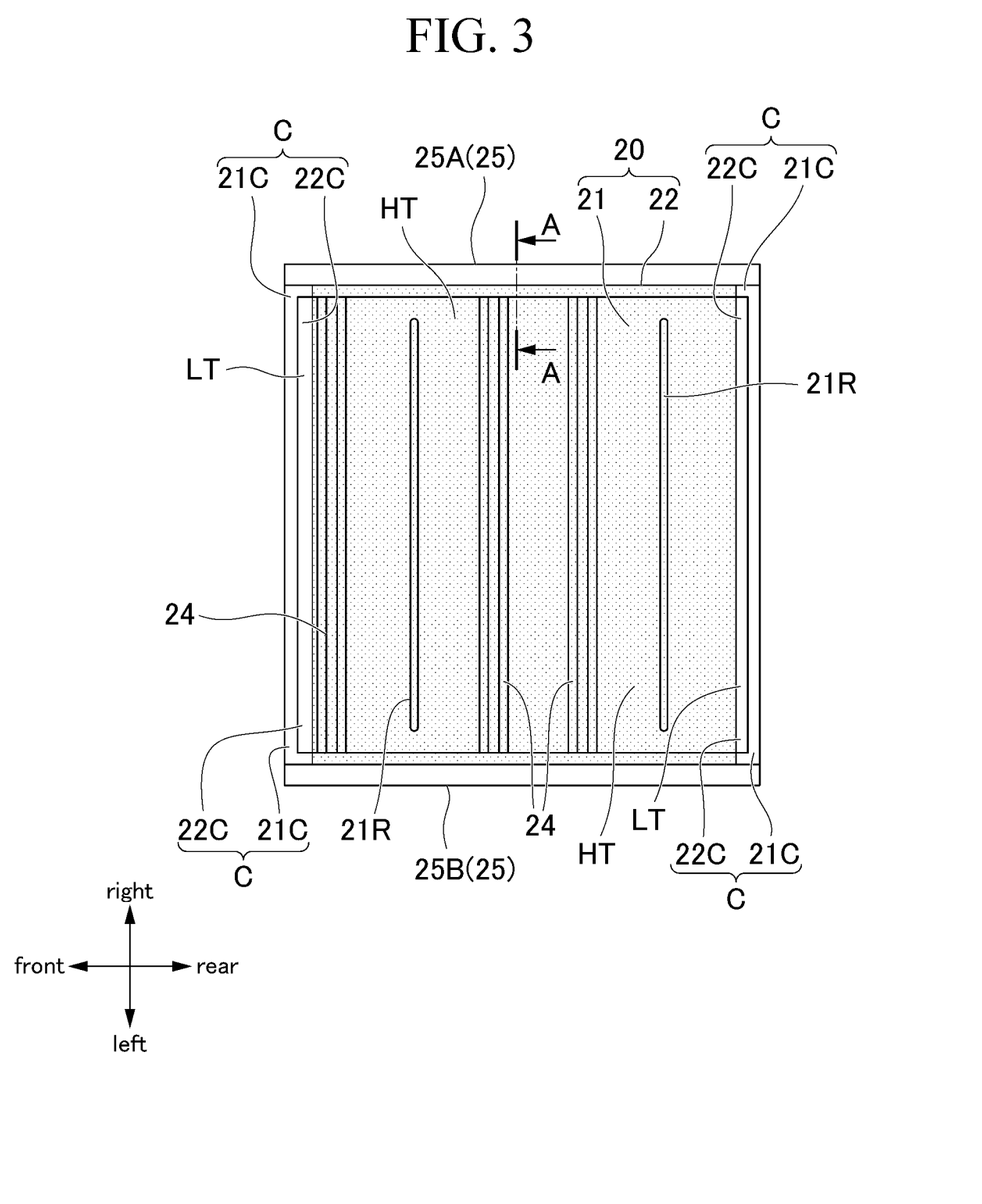
FIG. 3 is a plan view of a tray according to the embodiment.
Figure 4:
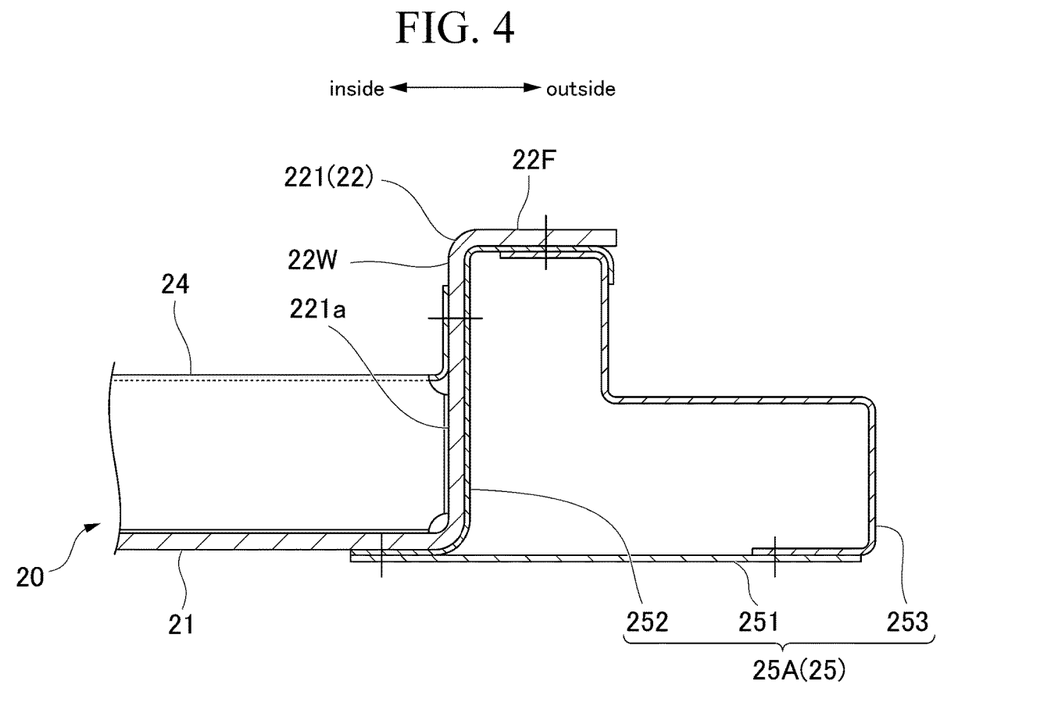
FIG. 4 is a cross-sectional view when viewed from an arrow A in FIG. 3.

FIG. 1 is an explanatory diagram of a tray 20 according to an embodiment. FIG. 2 is a perspective view of the tray 20 according to the embodiment. FIG. 3 is a plan view of the tray 20 according to the embodiment. FIG. 4 is a cross-sectional view when viewed from an arrow A in FIG. 3. Unless otherwise specified, a direction along a traveling direction of a vehicle (vehicle body 1) is referred to as a front-rear direction, a horizontal direction when viewed in the front-rear direction is referred to as a vehicle width direction, and a direction perpendicular to the vehicle width direction or the direction of gravity (vertical direction) when viewed in the front-rear direction is referred to as an up-down direction.

As shown in FIG. 1, the vehicle body 1 includes a frame 10 constituting a skeleton of the vehicle body 1 and a tray 20 (also referred to as a case or a container) on which a battery 30 such as a lithium ion battery is placed. The vehicle body 1 is driven by a battery 30 as a power source, such as an electric vehicle.

By protecting the battery 30 from a side collision (pole side collision) with a utility pole or the like, it is possible to suppress harm to an occupant due to an explosion of the battery 30 or the like. Therefore, in order to protect the battery 30, the tray 20 is disposed inside the vehicle from the position of a side member structure 100 (also referred to as a side sill). The tray 20 is usually disposed between a pair of side member structures 100 provided on right and left sides of the vehicle body 1 in the vehicle width direction.

Specifically, as shown in FIG. 2, the tray 20 includes a bottom wall 21 and a peripheral side wall 22 erected from an outer periphery of the bottom wall 21.

The bottom wall 21 is a polygon of a triangle or more in a plan view. For example, the bottom wall 21 is a quadrangle in a plan view, as shown in FIG. 3. The bottom wall 21 has four corner sections 21C.

Each corner section 21C of the bottom wall 21 is disposed adjacent to each corner portion 22C of the peripheral side wall 22 which will be described later.

The bottom wall 21 has a flat plate shape. The bottom wall 21 is made of steel, for example. The bottom wall 21 has an upper surface 21a disposed along a horizontal plane. In-vehicle parts such as the battery 30 are appropriately placed on the upper surface 21a. The bottom wall 21 has a rigidity that allows the battery 30 to be placed and supported on the upper surface 21a. The upper surface 21a is a reinforcing portion 21R formed along the vehicle width direction as appropriate in order to increase the rigidity of the bottom wall 21 against distortion in the vehicle width direction caused by an impact load from an outside of the vehicle to an inside of the vehicle such as a side collision. The reinforcing portion 21R may be a ridge or a groove formed along the vehicle width direction.

The peripheral side wall 22 has a polygonal shape corresponding to the polygonal shape of a peripheral edge of the bottom wall 21. For example, as shown in FIG. 3, when the bottom wall 21 is a quadrangle, the peripheral side wall 22 is a quadrangle. Specifically, the peripheral side wall 22 has a first side wall 221, a second side wall 222 adjacent to the first side wall 221, a third side wall 223 adjacent to the second side wall 222, and a fourth side wall 224 adjacent to the third side wall 223. The fourth side wall 224 is adjacent to the first side wall 221. As described above, the side walls from the first side wall 221 to the fourth side wall 224 are disposed in a closed annular shape so as to surround the bottom wall 21 from the peripheral edge of the bottom wall 21. The number of side walls constituting the peripheral side wall 22 is not limited to four as in the present embodiment, but may be three or more depending on the polygonal shape of the peripheral edge of the bottom wall 21.

Each side wall of the peripheral side wall 22 has an inner surface facing a center surrounded by the peripheral side wall 22. That is, as shown in FIG. 2, the first side wall 221 has a first side wall inner surface 221a. Similarly, the second side wall 222 has a second side wall inner surface 222a. The third side wall 223 has a third side wall inner surface 223a. The fourth side wall 224 has a fourth side wall inner surface 224a.

As shown in FIG. 4, the peripheral side wall 22 includes a peripheral side wall web 22W extending upward from a vehicle outer end portion of the bottom wall 21 and a peripheral side wall flange 22F, and has a cross section perpendicular to a direction in which the peripheral side wall 22 extends. As a result, even when the tray 20 including the peripheral side wall 22 can be easily formed from a flat steel sheet by pressing, the tray 20 can reasonably secure rigidity capable of resisting a load such as a shearing force and a moment. The cross section of the peripheral side wall 22 may be uniform along the peripheral edge of the bottom wall 21.

As shown in FIGS. 2 and 3, the tray 20 includes a high-strength portion HT having a high tensile strength and a low-strength portion LT having a tensile strength lower than that of the high-strength portion HT. From the viewpoint of weight reduction, the high-strength portion HT preferably has the tensile strength of 980 MPa or more, and more preferably the tensile strength of 1470 MPa or more. From the viewpoint of ease of processing, the low-strength portion LT has a tensile strength of 270 MPa to 440 MPa. The low-strength portion LT has, for example, a tensile strength of 270 MPa, 440 MPa, or 590 MPa. For example, when a steel sheet having a tensile strength of 1470 MPa is used as the high-strength portion HT, a steel sheet having a tensile strength of 270 MPa is used as the low-strength portion LT having a tensile strength lower than that of the high-strength portion HT.

Here, the low-strength portion LT includes a recessed portion C having a corner portion 22C in the first side wall inner surface 221a of the first side wall 221 and the second side wall inner surface 222a of the second side wall 222 which are adjacent to each other at a minor angle and a corner section 21C on the upper surface 21a of the bottom wall 21 having a minor angle to each of the first side wall inner surface 221a and the second side wall inner surface 222a in the corner portion 22C. As described above, the low-strength portion LT of the tray 20 is disposed to have the recessed portion C (a portion in which three surfaces such as the first side wall inner surface 221a, the second side wall inner surface 222a, and the upper surface 21a are adjacent to each other) in which the corner portion 22C of the peripheral side wall 22 and the corner section 21C of the bottom wall 21 are adjacent to each other. The minor angle is the smaller angle of angles that share two sides with a vertex.

Since the tray 20 has such a structure, the high-strength portion HT can be a region that mainly shares and receives the impact load acting on the tray 20 from the vehicle width direction. In addition, the recessed portion C that is difficult to press can be made into the low-strength portion LT. Therefore, the high-strength portion HT can prevent the tray 20 from being plasticized at an early stage and greatly deformed, and can be made relatively lightweight. In addition, the low-strength portion LT makes it possible to easily form the tray 20 having a box-shaped three-dimensional shape including the recessed portion C by pressing a steel sheet as a base metal. Therefore, a rigid and lightweight tray 20 can be provided.

Specifically, as shown in FIGS. 2 and 3, the tray 20 has the high-strength portion HT at a middle portion in the front-rear direction.

The high-strength portion HT is formed from the first side wall 221 to the third side wall 223 facing the first side wall 221 via the bottom wall 21. As a result, a range of a load transmission path when the impact load is applied can be set to the high-strength portion HT. Therefore, even when the sheet thickness of the tray 20 is reduced, the rigidity in the vehicle width direction can be increased, and thus, the weight can be efficiently reduced.

In the tray 20, a region including the recessed portions C having corner sections 21C disposed at two front positions and corner portions 22C corresponding to the corner sections 21C is the low-strength portion LT. Further, in the tray 20, a region including the recessed portions C having corner sections 21C disposed at two rear positions and corner portions 22C corresponding to the corner sections 21C is the low-strength portion LT. As described above, since the region including the recessed portion C having the corner section 21C and the corner portion 22C is the low-strength portion LT, the tray 20 can be easily manufactured by pressing the steel sheet as the base metal.

The tray 20 includes an inner reinforcing material 24 extending from the first side wall 221 to the third side wall 223 facing the first side wall 221 on the bottom wall 21. As a result, even when an impact load in the vehicle width direction acts on one of the first side wall 221 and the third side wall 223, a part of the impact load can be shared with the other of the first side wall 221 and the third side wall 223. Further, it is possible to increase the rigidity and buckling strength in the range of the load transmission path when the impact load acts in the vehicle width direction. Therefore, protection performance inside the tray 20 can be improved.

A plurality of the inner reinforcing material 24 may be provided. Further, the plurality of inner reinforcing material 24 may be provided side by side in the front-rear direction. As a result, when an impact load is applied to the first side wall 221 and the third side wall 223 in the vehicle width direction, the maximum bending moment around the vertical direction acting on a cross section perpendicular to the front-rear direction of the first side wall 221 and the third side wall 223 can be reduced, and displacement of the first side wall 221 and the third side wall 223 in the vehicle width direction can be suppressed. Further, the impact load in the vehicle width direction applied to one of the first side wall 221 and the third side wall 223 due to a side collision or the like can be dispersed to the plurality of inner reinforcing materials 24 and transmitted to the third side wall 223. Therefore, a cross section perpendicular to the longitudinal direction (vehicle width direction) of one inner reinforcing material 24 can be reduced and made compact. The inner reinforcing material 24 may be provided in a single number.

One end portion of the inner reinforcing material 24 is joined to the first side wall inner surface 221a of the first side wall 221 by welding or the like. The other end portion of the inner reinforcing material 24 is joined to the third side wall inner surface 223a of the third side wall 223 by welding or the like.

The inner reinforcing material 24 preferably overlaps with the high-strength portion HT. Accordingly, the effect of improving the rigidity by the inner reinforcing material 24 and the effect of improving the rigidity by the high-strength portion HT are combined, and thus, it is possible to effectively increase the rigidity in the range of the load transmission path when an impact load is applied in the vehicle width direction. Therefore, protection performance inside the tray 20 can be improved.

The first side wall 221 and the third side wall 223 include outer reinforcing materials 25 extending along the first side wall 221 and the third side wall 223. In general, the outer reinforcing material 25 includes a first outer reinforcing material 25A extending along the first side wall 221 and a second outer reinforcing material 25B extending along the third side wall 223. As a result, the impact load acting from the outside of the vehicle to the inside of the vehicle is dispersed in the front-rear direction of the outer reinforcing material 25, and then is transmitted to the bottom wall 21 via the first side wall 221 or the third side wall 223, and thus, the range of the load transmission path can be widened, and the load received by the tray 20 can be dispersed so as not to be concentrated locally. Therefore, protection performance inside the tray 20 can be improved.

Specifically, as shown in FIG. 4, the outer reinforcing material 25 (first outer reinforcing material 25A) has a hollow cross section to secure flexural rigidity and impact energy performance per unit mass with respect to an impact load acting from the outside of the vehicle toward the inside of the vehicle. Further, the outer reinforcing material 25 has a plurality of members extending along the front-rear direction, that is, a first member 251, a second member 252, and a third member 253. The cross section of the outer reinforcing material 25 has a closed annular shape by connecting the first member 251 to the second member 252 and the third member 253 to each other. The first member 251 and the second member 252 and the third member 253 are joined to each other by, for example, welding. For example, each of the first member 251, the second member 252, and the third member 253 is a flat steel sheet or a steel sheet bent and formed from a flat steel sheet. The outer reinforcing material 25 and the peripheral side wall 22 are joined to each other by welding or the like. The outer reinforcing material 25 is not limited to the portion formed of three members as in the present embodiment, but may be formed of a single member, may be formed of two members, or may be formed of a plurality of members such as four or more members.

(Manufacturing Method)

Next, a method of manufacturing the tray 20 will be described.

(1) First, a steel sheet serving as the high-strength portion HT having a high tensile strength and a steel sheet serving as the low-strength portion LT having a lower tensile strength than the high-strength portion HT are welded (welding step). Here, for example, a steel sheet having a tensile strength of 1470 MPa is used as the high-strength portion HT. Further, as the low-strength portion LT, a steel sheet having a tensile strength of 270 MPa is used. It is preferable that a sheet thickness of the steel sheet serving as the high-strength portion HT and a sheet thickness of the steel sheet serving as the low-strength portion LT are the same as each other.

(2) Next, the low-strength portion LT is pressed to include the recessed portion C having the corner portion 22C in the first side wall inner surface 221a of the first side wall 221 and the second side wall inner surface 222a of the second side wall 222 which are adjacent to each other at the minor angle and the corner section 21C on the upper surface 21a of the bottom wall 21 having the minor angle to each of the first side wall inner surface 221a and the second side wall inner surface 222a in the corner portion 22C (forming step). At the same time, the high-strength portion HT is pressed. Due to work hardening of the pressing, the tensile strength of the high-strength portion HT or the low-strength portion LT after the pressing can be increased higher than the tensile strength of the high-strength portion HT or the low-strength portion LT before the pressing.

According to the method for manufacturing the tray 20, even when the tray 20 has the high-strength portion HT, the recessed portion C, which is difficult to form by the pressing, is the low-strength portion LT. Accordingly, it is possible easily manufacture the tray 20 including the bottom wall 21 and the peripheral side wall 22 erected from the outer periphery of the bottom wall 21. Therefore, it is possible to provide a method for manufacturing the rigid and lightweight tray 20.

BRIEF DESCRIPTION OF THE REFERENCE SYMBOLS

1: vehicle body
10: frame
100: side member structure
20: tray
30: battery
21: bottom wall
21a: upper surface
21C: corner section
21R: reinforcing portion
22: peripheral side wall
22C: corner portion
22F: peripheral side wall flange
22W: peripheral side wall web
24: inner reinforcing material
25: outer reinforcing material
25A: first outer reinforcing material
25B: second outer reinforcing material
251: first member
252: second member
253: third member
221: first side wall
221a: first side wall inner surface
222: second side wall
222a: second side wall inner surface
223: third side wall
223a: third side wall inner surface
224: fourth side wall
224a: fourth side wall inner surface
C: recessed portion
HT: high-strength portion
LT: low-strength portion

The invention claimed is:

1. A tray including a bottom wall and a peripheral side wall erected from an outer periphery of the bottom wall, the tray comprising:
a high-strength portion having a high tensile strength; and
a low-strength portion having a tensile strength lower than that of the high-strength portion,
wherein the peripheral side wall includes a first side wall, a second side wall, a third side wall and a four side wall,
wherein the tray is quadrilateral including the first side wall, the second side wall, the third side wall, and the fourth side wall,
wherein the low-strength portion is formed in a region including a first recessed portion having:
a first corner portion in a first side wall inner surface of the first side wall and a second side wall inner surface of the second side wall which are adjacent to each other at a minor angle, and
a first corner section on an upper surface of the bottom wall having a minor angle to each of the first side wall inner surface and the second side wall inner surface in the first corner portion,
wherein the low-strength portion is further formed in a region including a second recessed portion having:
a second corner portion in the second side wall inner surface of the second side wall and a third side wall inner surface of the fourth side wall which are adjacent to each other at a minor angle, and
a second corner section on an upper surface of the bottom wall having a minor angle to each of the second side wall inner surface and the third side wall inner surface in the second corner portion,
wherein the low-strength portion is formed in a region including a third recessed portion having:
a third corner portion in a third side wall inner surface of the third side wall and the fourth side wall inner surface of the fourth side wall which are adjacent to each other at a minor angle, and
a third corner section on an upper surface of the bottom wall having a minor angle to each of the third side wall inner surface and the fourth side wall inner surface in the third corner portion,
wherein the low-strength portion is further formed in a region including a fourth recessed portion having:
a fourth corner portion in the fourth side wall inner surface of the fourth side wall and the first side wall inner surface of the first side wall which are adjacent to each other at a minor angle, and
a fourth corner section on an upper surface of the bottom wall having a minor angle to each of the fourth side wall inner surface and the first side wall inner surface in the fourth corner portion, and
wherein the high-strength portion is formed from the first side wall to the third side wall facing the first side wall via the bottom wall.

2. The tray according to claim 1,
wherein an inner reinforcing material extending from the first side wall to the third side wall facing the first side wall is provided on the bottom wall.

3. The tray according to claim 2,
wherein the inner reinforcing material overlaps with the high-strength portion.

4. The tray according to claim 1,
wherein the first side wall and the third side wall include an outer reinforcing material extending along the first side wall and the third side wall.

5. A method for manufacturing a tray including a bottom wall, and a peripheral side wall erected from an outer periphery of the bottom wall and including a first side wall, a second side wall, a third side wall and a fourth side wall, the tray comprising:
a high-strength portion having a high tensile strength; and
a low-strength portion having a tensile strength lower than that of the high-strength portion, wherein the tray is quadrilateral including the first side wall, the second side wall, the third side wall, and the fourth side wall, wherein the low-strength portion is formed in a region including a first recessed portion having:
- a first corner portion in a first side wall inner surface of the first side wall and a second side wall inner surface of the second side wall which are adjacent to each other at a minor angle, and
- a first corner section on an upper surface of the bottom wall having a minor angle to each of the first side wall inner surface and the second side wall inner surface in the first corner portion, wherein the low-strength portion is further formed in a region including a second recessed portion having:
- a second corner portion in the second side wall inner surface of the second side wall and a third side wall inner surface of the fourth side wall which are adjacent to each other at a minor angle, and
- a second corner section on an upper surface of the bottom wall having a minor angle to each of the second side wall inner surface and the third side wall inner surface in the second corner portion, wherein the low-strength portion is formed in a region including a third recessed portion having:
- a third corner portion in a third side wall inner surface of the third side wall and the fourth side wall inner surface of the fourth side wall which are adjacent to each other at a minor angle, and
- a third corner section on an upper surface of the bottom wall having a minor angle to each of the third side wall inner surface and the fourth side wall inner surface in the third corner portion, wherein the low-strength portion is further formed in a region including a fourth recessed portion having:
- a fourth corner portion in the fourth side wall inner surface of the fourth side wall and the first side wall inner surface of the first side wall which are adjacent to each other at a minor angle, and
- a fourth corner section on an upper surface of the bottom wall having a minor angle to each of the fourth side wall inner surface and the first side wall inner surface in the fourth corner portion, and wherein the high-strength portion is formed from the first side wall to the third side wall facing the first side wall via the bottom wall, and the method comprising:
welding the high-strength portion having a high tensile strength and the low-strength portion having a tensile strength lower than that of the high-strength portion; and pressing the low-strength portion so that the low-strength portion includes the first recessed portion, the second recessed portion, the third recessed portion and the fourth recessed portion.

\* \* \* \* \*